H. W. C. SCHRÖDER & J. H. & A. B. DRÄGER.
APPARATUS FOR TESTING GAS.
APPLICATION FILED NOV. 4, 1911.
1,033,626.
Patented July 23, 1912.
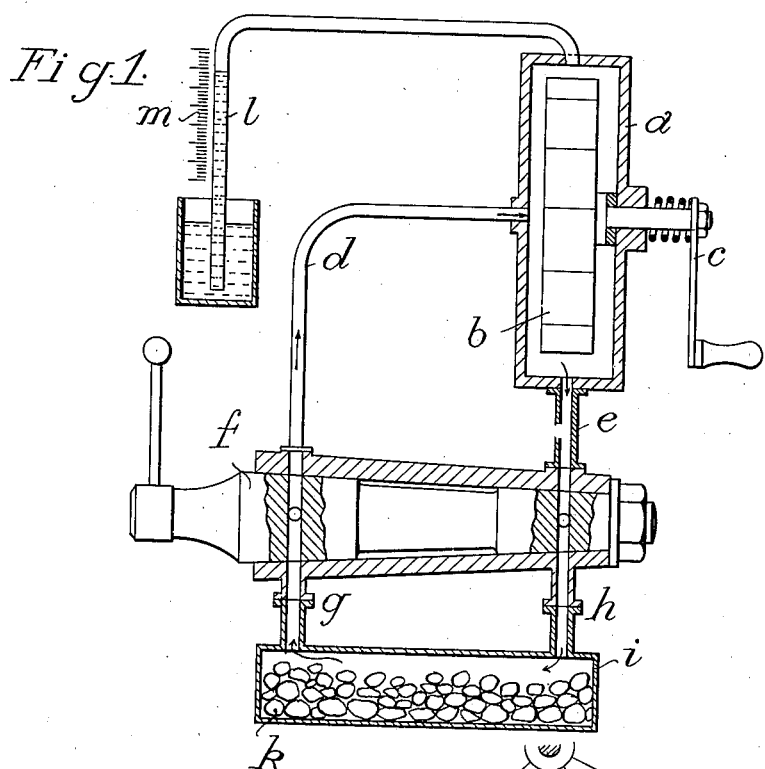
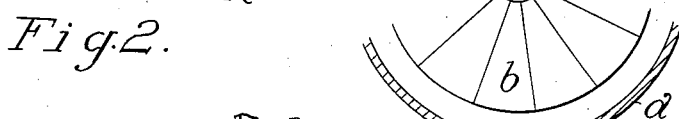
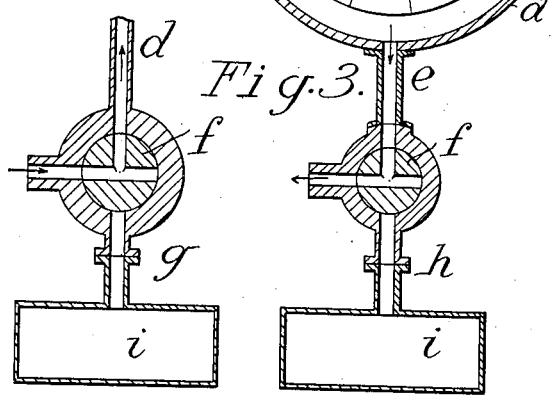

UNITED STATES PATENT OFFICE.

HANS WILHELM CHRISTIAN SCHRÖDER, JOHANN HEINRICH DRÄGER, AND ALEXANDER BERNHARD DRÄGER, OF LÜBECK, GERMANY, ASSIGNORS TO THE FIRM OF DRÄGERWERK, HEINR. & BERNH. DRÄGER, OF LÜBECK, GERMANY.

APPARATUS FOR TESTING GAS.

1,033,626.          Specification of Letters Patent.     Patented July 23, 1912.

Application filed November 4, 1911. Serial No. 658,601.

*To all whom it may concern:*

Be it known that we, HANS WILHELM CHRISTIAN SCHRÖDER, JOHANN HEINRICH DRÄGER, and ALEXANDER BERNHARD DRÄGER, all three subjects of the German Emperor, and residents of Lübeck, in Germany, have invented a certain new and useful Apparatus for Testing Gas, of which the following is a specification.

It is known to test or investigate gas mixtures of which the quantities of the gases are to be found out for instance carbonic oxid, carbonic acid or oxygen by leading a confined sample of gas to an absorption medium suitable for absorbing the gas to be tested and by measuring the decrease in pressure due to the elimination of one or more constituents.

Gas testing apparatus so far as known are objectionable in that they are not handy and operate with sealing liquids which readily overflow. The present apparatus is free of these drawbacks.

It consists of a ventilator casing communicating with an absorption chamber by two pipes and a cock, in such manner that according to the position of the cock the ventilator communicates alternately with the outer space or with the absorption material and that the sample of gas is driven through the apparatus in a circle.

In the accompanying drawing illustrating the invention Figure 1 is a section through the apparatus and Figs. 2 and 3 are transverse sections of the lower part of the apparatus taken through the pipes.

Within the casing $a$ a centrifugal ventilator or fan $b$ is arranged, the shaft of which is journaled in the wall of the casing and is provided with a crank $c$. By rotating the fan a vacuum is created in a pipe $d$ branching off from the center of the casing, and air pressure is created in the pipe $e$ branching off from the peripheral part of the casing $a$. Both pipes $d$ and $e$ lead to a three way cock $f$. According to the position of the cock (Figs. 2 and 3) communication of the pipes and of the interior of the fan casing is thus established with the outer space and thus a thorough change of gas is effected in the casing. From the cock $f$ two pipes $g$ $h$ lead to a closed space or chamber $i$, which is filled or partly filled with a material $k$ adapted to absorb a constituent of the gas to be tested.

When the change of gas has taken place the cock is turned into such position, that the outer space is shut off and a connection is produced between the fan-chamber and the absorption material, Fig. 1. When the crank $c$ is again operated a circulation of the inclosed gases takes place through the casing and the absorption chamber in the direction of the arrows, whereby on the repeated contact of the gases with the absorption material the latter absorbs all gas, that is to be determined with regard to quantity, for instance carbonic acid, carbonic oxid, or oxygen.

The reduction in the gas creates a corresponding reduction of pressure, which can be determined by any kind of monometer for instance by a column of liquid $l$ in a pipe communicating with the interior of the fan casing. By aid of a suitably divided scale $m$, close by, the percentage can be read off directly.

The absorption material may be inclosed in a cartridge, which can be easily replaced by a new one after a certain number of tests or measures.

In some cases, it may happen that the character of the gases or the dampness influences the correctness of the test or measure. To make such influences harmless a suitable substance can be placed within the casing or a special cartridge may be introduced before or after the testing or measuring, in order to reduce the injurious gas or dampness to the same amount before and after.

What we claim is:

1. A gas testing apparatus comprising a casing, a rotatable fan therein, a chamber for an absorption material, two pipes connecting the chamber with the fan casing in such manner as to permit a circulation of gas through the casing and chamber, and a cock in said pipes.

2. A gas testing apparatus comprising a casing, a rotatable fan therein, a chamber for an absorption material, two pipes connecting the chamber with the fan casing in such manner as to permit a circulation of gas through the casing and chamber, and a cock in said pipes having a plurality of passages arranged to connect the casing alternately with the chamber and the space outside the latter.

HANS WILHELM CHRISTIAN SCHRÖDER.
JOHANN HEINRICH DRÄGER.
ALEXANDER BERNHARD DRÄGER.

Witnesses:
OSCAR SCHMEIDTE,
JOHN WULF.